Jan. 13, 1970   A. A. DIRKS   3,488,797
POWERED CUTTING APPARATUS FOR SPLITTING H-BONES AND THE LIKE
Filed Dec. 21, 1967   3 Sheets-Sheet 1
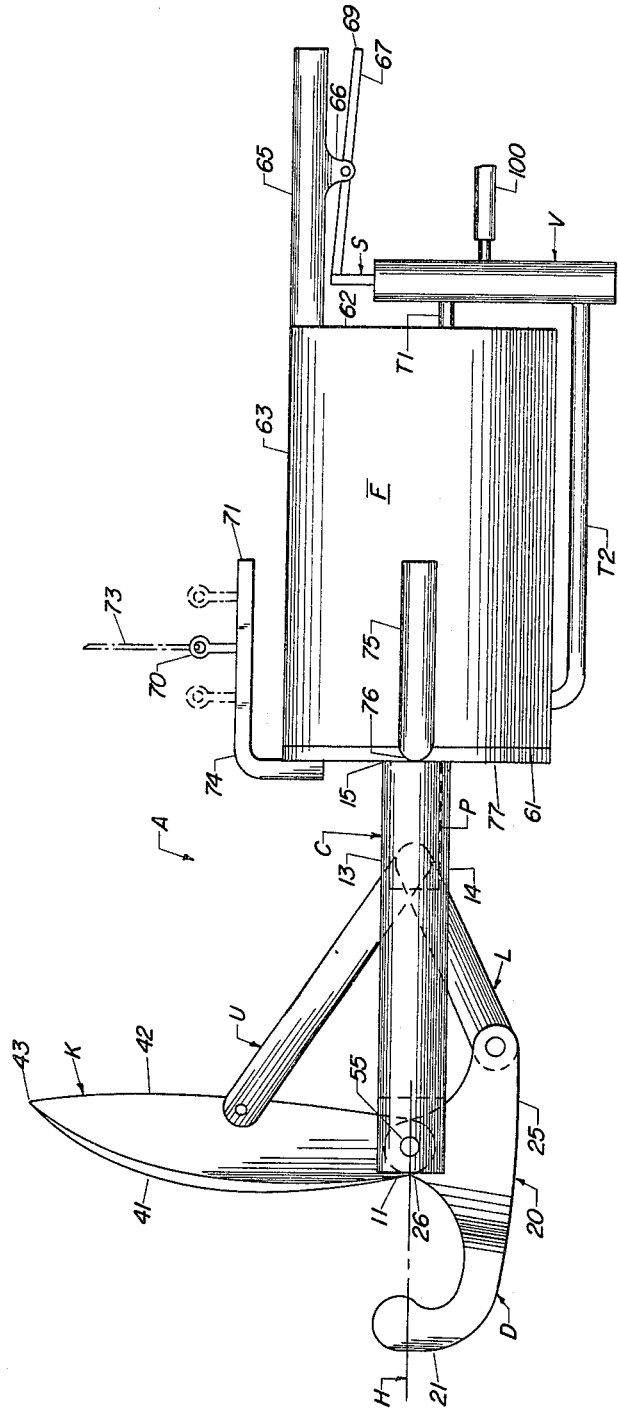
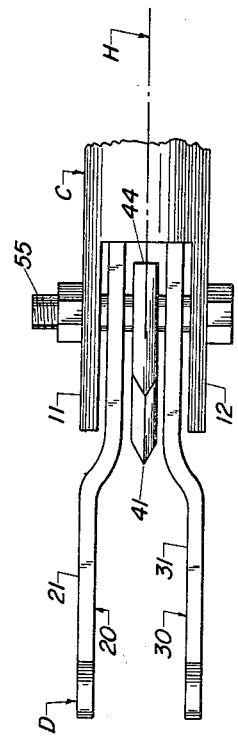
ARTHUR A. DIRKS
INVENTOR
BY *George R. Nimmer*
ATTORNEY Jan. 13, 1970  A. A. DIRKS  3,488,797
POWERED CUTTING APPARATUS FOR SPLITTING H-BONES AND THE LIKE
Filed Dec. 21, 1967  3 Sheets-Sheet 2
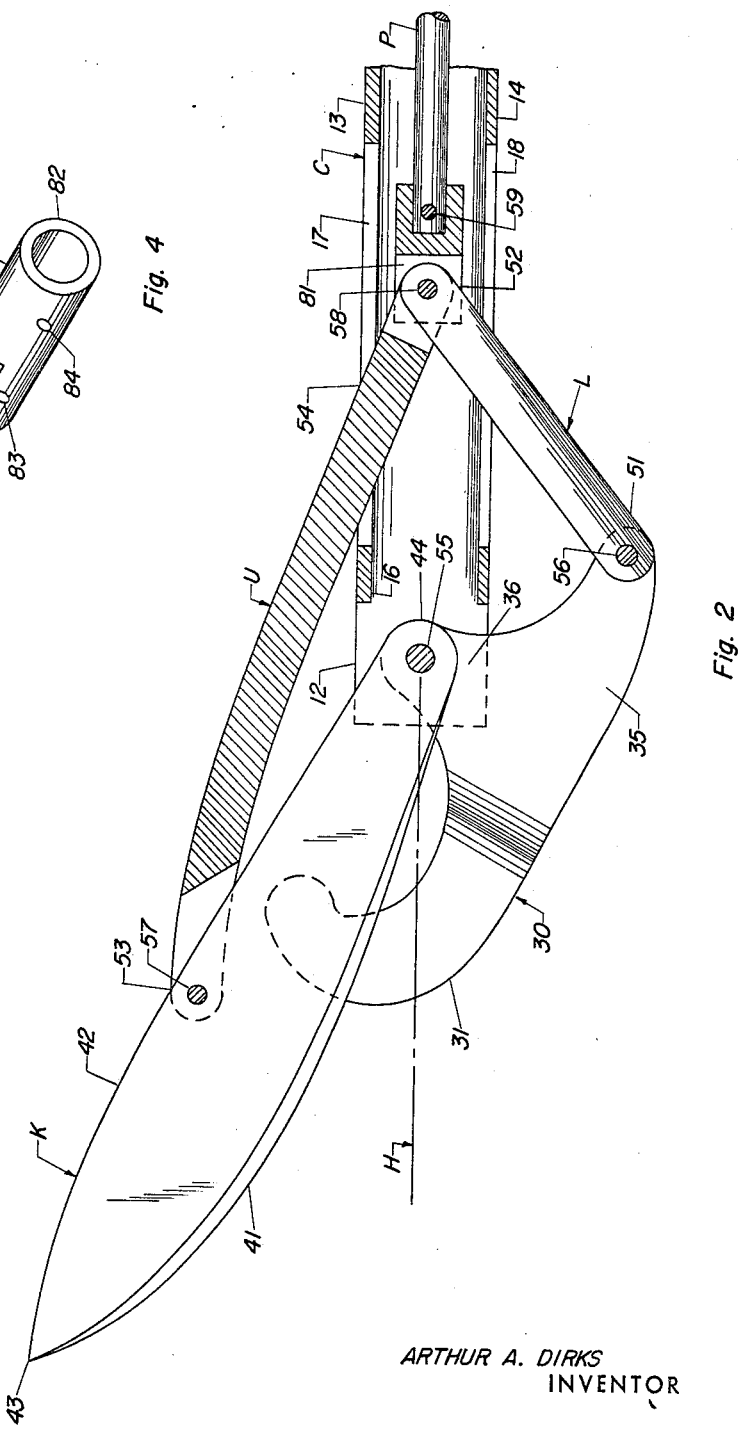
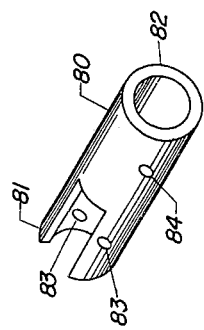
ARTHUR A. DIRKS
INVENTOR
BY *George R. Nimmer*
ATTORNEY

United States Patent Office 3,488,797
Patented Jan. 13, 1970

3,488,797
POWERED CUTTING APPARATUS FOR SPLITTING
H-BONES AND THE LIKE
Arthur A. Dirks, 5357 N. 47th St., Omaha, Neb. 68104
Filed Dec. 21, 1967, Ser. No. 692,584
Int. Cl. A22b 5/20; B26b 13/06, 15/00
U.S. Cl. 17—23                                    10 Claims

ABSTRACT OF THE DISCLOSURE

This invention relates to a powered cutting apparatus for splitting the H- or brisket bones of beef cattle carcasses and other butcher animals. In particular, this invention relates to a pneumatically-powered H- or pelvic bone cutter implement that will cleanly and quickly cleave the H-bone without attendant mutilation of the surrounding flesh, that is easy and simple to operate by a single unassisted production line worker, and that may be readily periodically sterilized and cleansed after use on each butcher animal carcass.

---

During the processing of beef cattle carcasses and the like in slaughter houses, the freshly-killed animal is normally suspended by its hind legs along a movable conveyor-rail. A longitudinal incision is made into the belly to partially expose the pelvic or H-bone which must also be longitudinally split or cleaved preparatory to facilitate subsequent evisceration of the animal and ultimate dressing of the various edible meat parts. The necessary cleavage of the H-bone in beef cattle represents a difficult operation owing to the unusual shape, contour, and inaccessible recessed location of the bovine pelvic structure.

In the prior art cleavage of the bovine H-bone has been accomplished by a variety of devices, with both manually-operated tools and powered apparatuses. Hand manipulated cleavers, hatchets, and saws have been used since ancient times and are yet widely employed, but they are inherently slow in performing the cleavage operation, are apt to injure the operator, and invariably produce a jagged bisection resulting in a profusion of bone chips embedded into the adjacent beef loins. Among the powered apparatuses of the prior art for cleaving the H-bone, many deficiencies are known to exist. For example, it is difficult to correctly securely position the cutter portion i.e. sharp knife or saw blade, at the longitudinal axis of the relatively-inaccessible half-buried oddly-shaped H-bone. The cutter portion of many prior art powered apparatuses are difficult to control thus resulting in mutilation of valuable beef areas located in the immediate vicinity of the H-bone. In other prior art powered apparatuses, the apparatus power mechanism is so bulky and cumbersome that the apparatus is awkward to employ even by unusually muscular operating personnel. Moreover, it is difficult to necessarily cleanse or sterilize most prior art powered apparatuses after each animal carcass has been operated upon, owing to the complex, bulky, and unwieldy nature of prior art powered apparatuses generally. While in certain of the smaller non-bovine butcher animals e.g. hogs and sheep, the pelvic bone is relatively easy to split by prior art methods, similar type difficulties exist for the cleaving of the brisket bone of the smaller non-bovine animals.

It is accordingly the general object of the present invention to overcome the several shortcomings and disadvantages of the prior art normally associated with powered cutting apparatuses for splitting bovine pelvic bones.

It is another general object of the present invention to provide a powered H-bone cutting apparatus wherein the cutter portion is a sharp knife blade, rather than as a reciprocatable serrated saw, whereby messy detrimental bone chips are not associated with the cutting operation.

It is yet another general object of the present invention to provide a powered cutting apparatus that is adapted to longitudinally split the brisket bone of relatively small non-bovine butcher animals.

It is a further general object of the present invention to provide a powered cutting apparatus that also lends itself to the cutting of small-diameter tree limbs.

It is a specific object of the present invention to provide a powered H-bone cutting apparatus wherein it is relatively easy to desireably securely position the knife blade cutter portion along the longitudinal axis of the relatively inaccessible half-buried H-bone.

It is another object of the present invention to provide a knife cutter portion for the powered H-bone cutting apparatus that will cleanly and quickly cleave a half-buried bovine H-bone without substantial ancillary mutilation of the adjoining valuable beef parts.

It is yet another object to provide a reliable powering apparatus for the H-bone cutting apparatus that does not introduce cumbersome or unwieldy characteristics into the apparatus whereby the average operator may utilize same without undue fatigue to himself.

It is a further object to provide a powered H-bone cutting apparatus that is of such construction and manipulability that it might be readily cleansed and sterilized after operation upon each butcher animal carcass.

It is another object of the present invention to provide a powered H-bone cutting apparatus wherein the functional structural features thereof lend themselves to a variety of kinds of butcher animals and operational environmental conditions.

It is yet another object to provide a powered bone cutter apparatus for butcher animals that is adapted for use on suspended carcasses as well as upon prone carcasses.

With the above and other objects and advantages in view, which will become more apparent as the description proceeds, the invention comprises the novel configuration, combination, and arrangement of parts hereinafter described and particularly as pointed out in the appended claims, reference being had to the accompanying drawings wherein like numerical or alphabetical characters refer to like parts in the several views and in which:

FIGURE 1 is a side elevational view of the preferred form of the powered cutting apparatus of the present invention that comprises a dual-hook member and an elongate knife operatively positioned at the forward portion of an elongate casing and a frame member disposed rearwardly of said elongate casing.

FIGURE 2 is a detailed side elevational view, partially in section, of the elongate casing portion of the cutting apparatus shown in FIGURE 1, the elongate knife portion being shown at its forward position.

FIGURE 3 is a bottom plan view of the forward portion of the elongate casing portion to show the preferred relationship between the dual-hook member and the cutting blade.

FIGURE 4 is a perspective view of an adapter or yoke component of the present invention.

Figure 5:
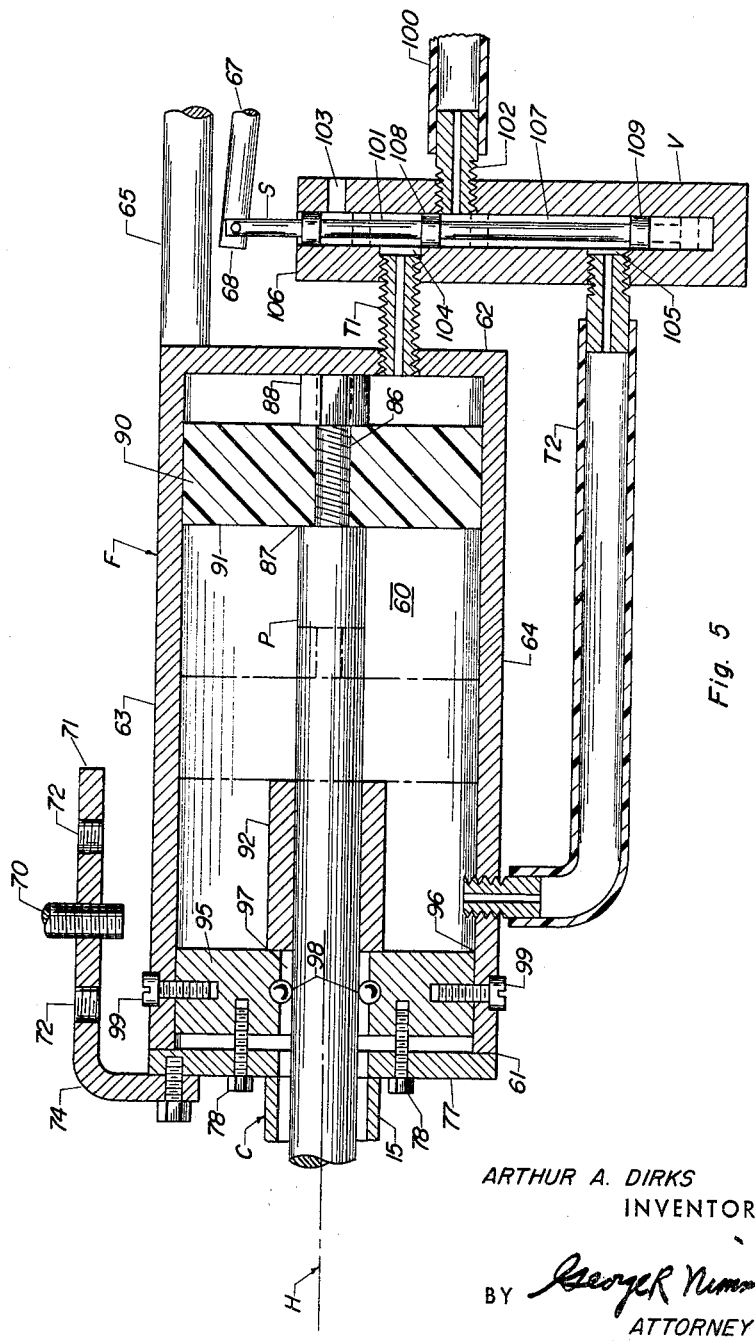
FIGURE 5 is a sectional elevational view of a pressurized-fluid powering component of the present invention.

The powered cutting apparatus A of the present invention comprises essentially: an elongate horizontal forward casing C disposed along a horizontal elongate axis H and a rearwardly disposed frame member F; an elongated horizontal reciprocatable piston P disposed along axis H and traversing the integral connection between casing C and frame F; a dual hook member D comprising a pair of upwardly-extending parallel prongs 21 and 31 transversely spaced apart a finite distance on either side of axis H, said prongs 21 and 31 being disposed a finite distance forwardly of elongate casing C to engage the H- or brisket bone, or whatever is to be cut or split; a uniplanar knife K along axis H and having a convex forward sharp edge 41, the lower portion 44 of said knife K being disposed within and pivotably attached to a forward terminus clevis 11–12 of casing C; and an upper-link U disposed on the upper side of casing C and pivotally connected to the uniplanar knife K and also to the forward portion of reciprocatable piston P whereby as said piston P travels in the forward direction the blade convex edge 41 moves forwardly between prongs 21 and 31, whereby the H-bone or the like is cut therethrough by knife blade K.

Elongate horizontal casing C is preferably of tubular configuration, herein of circular cross-sectional shape surrounding a longitudinal horizontal axis H. The forward end of elongate casing C terminates as a pair of forwardly-extending substantially-parallel tongues 11 and 12, said tongues 11 and 12 being transversely spaced apart a finite distance with longitudinal axis H being disposed therebetween. Casing C includes an upper side 13, a lower side 14, and a rearward end 15 that is attached, as by welding, to the forward end of frame F. As indicated in FIGURE 2, the casing upper side 13 has an elongate slot 17 to accommodate upper-link U therealong as piston P reciprocates; similarly, casing lower side 14 has an elongate slot 18 therealong to accommodate an upper-link L therealong as piston P reciprocates. Casing upper side 13 has a full-bodied unslotted portion 16 immediately rearwardly of tongues 11 and 12 whereby said full-bodied portion 16 enhances the structural strength of casing C.

The important dual-hook member D is attached to casing C and disposed below axis H and casing C, said dual-hook member comprising a pair of upwardly-extending substantially-parallel prongs 21 and 31, said prongs 21 and 31 being transversely spaced apart a finite distance with longitudinal axis H being disposed therebetween. There is a finite spatial gap between the rearward extremity of upwardly-extending prongs 21 and 31 and the forward extremity of the casing tongues 11 and 12 when piston P is at its rearward limit of travel whereby an H-bone or whatever else is to be cut might be inserted therebetween. Dual-hook member D preferably comprises a rearwardly-extending shank means disposed below casing C including an upwardly-extending shank-ear e.g. 26, said shank-ear 26 being pivotably attached between casing tongues 11 and 12 by means of first pivot pin 55 passing transversely through tongues 11 and 12 and a shank-ear e.g. 26. With the said desirable pivotably attached dual-hook member, there is a lower-link L disposed on lower side of casing C and pivotably connected to the rearward portion of the dual-hook member shank as at 56 and also to the forward portion of piston P; thus, as said piston P travels in the forward direction, prongs 21 and 31 move rearwardly-upwardly tightly against the H-bone or the like while knife blade K concurrently moves forwardly-downwardly at a faster rate whereby the H-bone is securely engaged at all times by apparatus A while the H-bone is being severed by knife K.

The preferred type of dual-hook member D comprises two separate independent uni-hooks 20 and 30. As can best be seen in FIGURES 2 and 3, each uni-hook i.e. 20 and 30, is provided of similarly patterned strap metal comprising an upwardly-extending prong i.e. 21 and 31, the respective prongs 21 and 31 being generally of C-shaped concave configuration whereby the rearward side of said prongs is generally concave to facilitate grasping of an H-bone or the like. Each uni-hook comprises a rearwardly-extending integral shank e.g. shank 25 on uni-hook 20 and shank 35 on uni-hook 30, each shank including rearwardly of the prong component an upwardly-extending transversely-perforate shank-ear e.g. shank-ear 26 coplanar with shank 25 and shank-ear 36 coplanar with shank 35. The said shank-ears 26 and 36, with axis H therebetween, are disposed in parallelism between casing tongues 11 and 12 and pivotably attached thereto as by means of first pivot pin 55 passing transversely through perforate shank-ears 26 and 36 and also through transverse perforations in casing tongues 11 and 12. As aptly illustrated in FIGURE 3, the uni-hook members 20 and 30 forwardly of the shank-ear are transversely outwardly offset whereby the transverse spacing between prongs 21 and 31 is substantially equal to the transverse spacing between casing tongues 11 and 12, said prongs transverse spacing exceeding that of shank-ears 26 and 36.

Lower-link L is preferably as an elongate length of strap metal including a forward end 51 and a rearward end 52, said lower-link forward end 51 being transversely disposed between the rearwardly-extending shanks 25 and 35 of uni-hook members 20 and 30, respectively, said lower-link L being pivotably attached to the said dual-hook member D by means of a second transverse pivot pin 56 passing through shanks 25 and 35 and intervening lower link L. The rearward end 52 of lower-link L is pivotably attached to the forward portion of piston P as by means of adapter or yoke 80 and fourth pivot pin 58, as will be pointed out later in greater detail.

Elongate knife K is preferably of uniplanar configuration and comprises a convex forward cutting edge 41 and a rearward side 42 that intersect at knife upper end 43, and a lower portion 44 disposed between casing tongues 11 and 12 and also disposed along longitudinal axis H. Knife lower portion 44 is pivotably attached to casing tongues 11 and 12 rearwardly of prongs 21 and 31 by means of said first transverse pivot pin 55, transversely passing through the following members, in order: casing tongue 11, shank-ear 26, knife lower portion 44, shank-ear 36, and finally casing tongue 12.

Upper-link U is preferably as an elongate length of strap metal, the length of which exceeds that for lower-link L, including a clevis forward end 53 and a rearward end 54. Clevis forward end 53 surrounds knife K rearward side 42 nearer to knife upper end 43 than to knife lower end at 55, and clevis 53 is pivotably attached to knife K as by means of third transverse pivot pin 57 passing through clevis 53 and intervening knife K. The rearward end 54 of upper-link U is pivotably attached to the forward portion of piston P, as by means of adapter or yoke 80 and a fourth pivot pin 58, as will be explained later in greater detail.

The length of knife K between its pivotal attachment at 55 and its upper free end at 43 bears a ratio in the range of at least two (2) and preferably less than five (5) compared to the length of the finite spatial gap between the forward extremity of coextensive casing tongues 11 and 12 and the rearward extremity of coextensive prongs 21 and 31 when piston P is at its rearward limit of travel as shown in FIGURE 1. At the rearward limit of travel for piston P, the entire concave forward sharpened side 41 of blade K is disposed rearwardly of prongs 21 and 31, as determined by the length of upper-link U. At the forward limit of travel for piston P the lower reaches of blade forward side 41 (commencing at blade lower portion 44) are disposed forwardly of the rearward extremity of coextensive prongs 21 and 31 and also below axis H, and the upper reaches of blade forward side 41 (commencing at blade upper end 43) preferably remain disposed above said horizontal axis H. Upper-link U is pivotably attached to knife K at 57 nearer to upper end 43 than to lower pivot point 55, and upper-link U is longer than lower-link L whereby knife edge 41 travels faster than do prongs 21 and 31 as piston P moves forwardly. When the relationships specified in this paragraph exist, longitudinal cleavage of the typical bovine H-bone is readily accomplished by the forwardly moving piston P without attendant mutilation of the beef cuts adjacent to the H-bone.

There are means for reciprocating the elongate piston P for a finite degree of travel along the horizontal axis H, said means utilizing compressed air or other pressurized-fluid, including a fluid barrier e.g. gasket 90, slidably engaged within cylindrical frame F. The pneumatically-powered plunger or gasket reciprocating means, as had been mentioned earlier, has been responsible for the bulky cumbersomeness of prior art powered H-bone cutters. However, as will be pointed out, the external frame F for the pneumatically-powered means of the present invention includes certain features and attachments to overcome the inherent cumbersomeness of the pneumatically-powered plunger or gasket 90 contained within frame member F.

Frame member F is of a generally cylindrical close-ended shape, the longitudinal axis of which is positioned along horizontal axis H, and frame F has a rearward end wall 62 and a forward end wall 61 at the casing rearward end 15. Frame upper side 63 is disposed above casing upper side 13 while frame lower side 64 is disposed below casing lower side 14, sides 63 and 64 being provided of a single cylindrical member whereby the longitudinal inner wall 60 of frame F is circular about axis H. There are means to actuate the piston reciprocating means, herein as valve V and passageways T1 and T2 that supply compressed air or other pressurized fluid into frame F, said valve V being attached to frame F specifically to rearward end wall 62 and extending rearwardly therefrom. Valve V includes an upwardly extending vertical spindle S that is substantially parallel to rearward end wall 62 and that terminates below frame upper side 63 and also below primary handle 65. Valve spindle S, together with lever 67, provides a manually-actuatable regulator for selectively directing pressurized fluid into passageways T1 and T2.

Primary handle 65 is attached to frame member F, as by welding to rearward end wall 62, and extends rearwardly of frame rearward end 62 for a finite distance. Primary handle is preferably of a cylindrical tubular shape, is substantially parallel to horizontal axis H, and is located nearer to frame upper side 63 than to said axis H. Disposed immediately beneath primary handle 65 and actually engaged wtih spindle S is a finger control lever 67 having a forward end 68 that is pivotably attached to the upper end of spindle S and a lever rearward end 69 that is located immediately below the rearward terminus of primary handle 65. The underside of primary handle 65 between the primary handle forward and rearward ends includes a downwardly-extending clevis 66, and the medial region of lever 67 is disposed within clevis 66 and pivotally attached thereto. Thus, as a right-handed operator of cutter A manually grasps primary handle 65 with the right hand, he might pull upwardly on the rearward portion of lever 67, thus manipulating the valve regulator means e.g. valve spindle S and attached lever 67.

There is a secondary handle 75 disposed in substantial parallelism to horizontal axis H and substantially coplanar therewith, said secondary handle 75 spaced a finite distance transversely outwardly of frame member F. The forward portion 76 of secondary handle 75 is disposed transversely alongside frame forward end 61 whereby manual manipulation of cutter A by the operator is facilitated. Handle 75 desirably integrally includes a transverse centrally-perforate flange 77 that surrounds casing rearward portion 15, and flange 77 is removably attached to frame forward end wall 61 as by means of screws 78. With such centrally-perforate removably-attachable flange 77, the secondary handle 75 may be readily positioned on either transverse side of frame F appropriate to the right or left handedness of the operating personnel. For example, a right-handed operator would normally place his right hand on primary handle 65 and grasp secondary handle 75 with his left hand; conversely, a left-handed operator would rotate flange 77 so that secondary handle 75 could be grasped in the right hand.

It has been found desirable to removably attach a suitable counterbalance, that terminates immediately above cutter A, to one of a selectable plurality of longitudinal positions with respect to frame F. Accordingly, there is provided a counterbalance engagement means, herein as eye-bolt 70 removably engaged with a multi-perforate arm 71, whereby a selected longitudinal position of frame F may be removably attached to a suitable counterbalance e.g. 73. Horizontal arm or bar 71 is disposed above frame F in substantial parallelism with axis H and with frame upper side 63. There is a plurality of vertical threaded perforations 72 spaced along horizontal longitudinal arm 71 and threaded eye-bolt 70 is threadedly engaged with one of said threaded perforations whereby the operator may readily select a convenient counterbalance situation along the longitudinal length of frame F. Arm 71 has a downwardly-depending forward flange 74 that is attached to the forward portion of frame F, herein to centrally-perforate flange 77. The removably engaged counterbalance e.g. 73, tends to vertically suspend apparatus A at a desired longitudinal location e.g. 70, while primarily horizontal forces are manually directed to handles 65 and 75.

The preferred pivotal attachment of upper-link U and lower-link L to the forward portion of piston P entails the use of adapter or yoke 80. As can be seen in FIGURE 4, adapter 80 comprises a short length of tubular stock, the length thereof being less than about twice the outside diameter thereof, including a full-bodied rearward end 82 and a vertically longitudinally-slotted or clevis forward end 81. Adapter 80 includes a pair of transverse perforations including a forward transverse perforation 83 through both clevis arms and a rearward transverse perforation 84 through the adapter full-bodied rearward end 82. The full-bodied rearward end 82 surrounds the normally cylindrical forward end of piston P and is removably attached thereto as by means of fifth transverse pivot pin 59 passing through perforation 84 of adapter rearward end 82 and the forward portion of piston P. As can be seen in FIGURE 2, the rearward ends 52 and 54 of lower-link L and upper-link U, respectively, are vertically disposed in side-by-side transverse relationship within the vertical slot of adapter clevis 81 and pivotally removably attached thereto as by means of fourth transverse pivot pin 58 passing through perforation 83 of adapter clevis 81. Thus as piston P reciprocates in the forward and rearward directions, upper-link U travels along casing upper slot 17 while lower-link L travels along casing lower slot 18.

The FIGURE 5 sectional elevational view illustrates the preferred pneumatic type piston actuation means including slidable gasket 90, together with said valve V and the valve regulator means e.g. valve spindle S together with lever 67. The rearward portion of piston rod P is disposed along horizontal axis H and extends into the internal space of hollow tubular frame F. The terminal rearward portion 86 of piston P is relatively narrow and threaded whereby said piston P is provided with a rearward-shoulder 87 at the juncture of said narrowed threaded rearward portion 86 and the main cylindrical body of piston P. Centrally-perforate gasket 90 having a circular cross-sectional shape is slidably disposed along the circular longitudinal internal wall 60 of frame member F. Gasket 90 surrounds piston terminal portion 87 and axis H, the forward side 91 of gasket 90 being maintained in tight abutment against upright shoulder 91 of gasket 90 being maintained in tight abutment against upright shoulder 87 by means of nut 88 threadedly engaged with the end of threaded neck 86. Frame member forward end area 61 is provided by centrally-perforate gland 95, said gland 95 having a circular cross-sectional periphery at 96 that is tightly surrounded by circular internal wall 60. Gland 95 is removably attached to frame F by means of suitable fasteners e.g. threaded screws 99 passing vertically through frame F and threadedly engaged with gland 95. Gland central opening 97 surrounds piston rod P and axis H, and piston P is slidably engaged with gland 95 as by O-ring 98 that surrounds axis H and plunger P, said O-ring 98 being attached to gland 95 at central opening 97.

There is a tubular spacer member 92 that surrounds piston P and axis H, said tubular spacer 92 being disposed between gland 95 and gasket 90. As will be explained later, the elongate length of tubular space 92 provides a means for governing or determining the stroke length of reciprocatable piston P.

Valve V comprises a vertical axial bore 101 commencing at valve upward end 106 said bore 101 being circular cross-sectional shape. Communicating with valve bore 101 are four lateral ports for valve V including: air fluid-supply port 102, exhaust port 103, first-port 104, and second-port 105. Fliud-supply port 102 is disposed between first-port 104 and second-port 105, and the pressurized fluid e.g. compressed air, is introduced into vertical bore 101, as by means of incoming conduit 100. First tube or passageway T1, herein as a threaded member, is threadedly engaged with first-port 104 and with an opening of frame rear end wall 62 whereby the compressed air fluid might be introduced into the frame member hollow interior rearwardly of gasket 90 at the rearward limit of travel for piston P. Second tube or passageway T2 provides a continuous passageway for compressed air fluid from second-port 105 into the interior of frame member F, adjacent to frame forward end 61 and forwardly of gasket 90 at the forward limit of travel for piston P. Upright spindle S, which provides a portion of the regulator means for valve V, is disposed along valve axial bore 101 and extends upwardly of valve top end 106. Spindle S comprises two shoulders 108 and 109 separated by a grooved portion 107, said shoulders being of circular cross-sectional shape whereby spindle S is slidably supported along axial bore 101. At the upper primary station for spindle S upper shoulder 108 is disposed between supply port 102 and first-port 104 while at the lower primary station for spindle S, as indicated in phantom line in FIGURE 5, upper shoulder 108 is disposed between supply port 102 and second-port 105. The spindle upper end is pivotably attached to the forward end 68 of lever 67, forwardly of lug 66.

In operation of cutting apparatus A, the member to be split or cleaved by elongate cutting blade K is inserted into the gap between the upwardly-extending prongs of dual-hook member D and the forward end of casing C. For example, inserted into the said gap would be the central forward portion of a bovine pelvic (H) bone, the central forward portion of a non-bovine brisket bone, the tree limb to be cut, etc. Then, the operator would pull upwardly on lever 67 at 69 to cause pressurized-fluid to push piston P forwardly which causes knife K to be pivoted forwardly-downwardly between prongs 21 and 31, whereby the bone or object to be cleaved is balanced securely between said prongs and knife while the cleavage is being accomplished by knife edge 41. Then, the operator actuates lever 67 in the reverse direction causing reverse movement in gasket 90, piston P, and knife K whereby the apparatus A including dual-hook member D is readily withdrawn from the object cleaved by knife edge 41.

From the foregoing, the construction and operation of the cutting apparatus will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed is as follows:

1. A powered cutting apparatus for longitudinally splitting the H and brisket bones of beef cattle carcasses and other butcher animals, said powered cutting apparatus comprising:

(A) an elongate horizontal casing disposed along a horizontal elongate axis, said elongate casing including a casing forward end, a casing rearward end, a casing upper side, and a casing lower side;

(B) a frame member attached to the said elongate casing and extending rearwardly therefrom along said horizontal axis, said frame member including a frame rearward end, a frame upper side, a frame lower side, and a frame forward end positioned adjacently rearwardly of the elongate casing rearward end;

(C) an elongate horizontal reciprocatable piston positioned along the said horizontal axis, the said elongate piston having a forward end disposed forwardly of the frame member forward end and having a rearward end disposed rearwardly of the frame member forward end, said elongate piston being slidably engaged with respect to the frame member;

(D) means for reciprocating the elongate horizontal piston for a finite stroke length in alternate forward and rearward directions along the said horizontal axis whereby said horizontal piston has a forward and a rearward limit of travel;

(E) a dual-hook member disposed below the said horizontal axis and attached to the elongate horizontal casing, said dual-hook member including a pair of upwardly-extending prongs spaced transversely apart a finite distance whereby the said horizontal axis is disposed between said prongs, the rearward side of the said prongs being of a concave configuration and being spaced a finite distance forwardly of the casing forward end;

(F) an elongate substantially uniplanar knife having a convex forward cutting edge, a rearward side, an upper end, and a lower portion remote of the knife upper end, said convex forward cutting edge being disposed along a vertical plane passing between said upwardly-extending prongs, the lower portion of said elongate knife being pivotably atttached to the elongate casing nearer the casing forward end than to the casing rearward end;

(G) an upper link disposed above the said horizontal axis and having a forward end and a rearward end, said upper-link rearward end being pivotably attached to the forward end of the horizontal reciprocatable piston, said upper-link forward end being pivotably attached to the said elongate knife nearer to the knife upward end than to the knife pivotal connection with the casing whereby the said elongate knife pivots in alternate forward-downward and rearward-upward directions as said piston reciprocates for a finite stroke length in alternate forward and rearward directions, the length of the upper-link being sufficiently short so that at the rearward limit of travel for the said reciprocatable piston the entire forward cutting edge of the elongate knife is disposed rearwardly of said upwardly-extending prongs and the major portion of the elongate knife including the upper end thereof is disposed above the horizontal axis;

(H) handle means attached to the frame member and including a primary handle extending rearwardly of the frame member, said primary handle being disposed above said horizontal axis, and a secondary handle spaced a finite distance transversely outwardly of the frame member, said secondary handle being disposed forwardly of the primary handle; and (I) counterbalance engagement means attached to the frame member and disposed along the frame upper side.

2. A powered cutting apparatus for longitudinally splitting the H and brisket bones of beef cattle carcasses and other butcher animals, said powered cutting apparatus comprising:

(A) an elongate horizontal casing disposed along a horizontal elongate axis, said elongate casing including a casing forward end, a casing rearward end, a casing upper side, and a casing lower side;

(B) a frame member attached to the said elongate casing and extending rearwardly therefrom along said horizontal axis, said frame member including a frame rearward end, a frame upper side, a frame lower side, and a frame forward end positioned adjacently rearwardly of the longate casing rearward end;

(C) an elongate horizontal reciprocatable piston, positioned along the said horizontal axis, the said elongate piston having a forward end disposed forwardly of the frame member forward end between the casing forward and rearward ends and having a rearward end disposed rearwardly of the frame member forward end, said elongate piston being slidably engaged with respect to the frame member;

(D) means for reciprocating the elongate horizontal piston for a finite stroke length in alternate forward and rearward directions along the said horizontal axis whereby said horizontal piston has a forward and a rearward limit of travel;

(E) a dual-hook member disposed below the said horizontal axis and pivotably attached to the elongate horizontal casing nearer to the casing forward end than to the casing rearward end, said dual-hook member including a pair of upwardly-extending prongs spaced transversely apart a finite distance whereby the said horizontal axis is disposed between said prongs, the rearward side of the said prongs being spaced a finite distance forwardly of the casing forward end, the said dual-hook member including a shank portion extending rearwardly of the pivotal connection between the dual-hook member and the casing, said shank portion terminating forwardly of the casing rearward end;

(F) an elongate substantially uniplanar knife having a convex forward cutting edge, a rearward side, an upper end, and a lower portion remote of the knife upper end, said convex forward cutting edge being disposed along a vertical plane passing between said upwardly-extending prongs, the lower portion of said elongate knife being pivotably attached to the elongate casing nearer to the casing forward end than to the casing rearward end;

(G) a lower-link disposed below the said horizontal axis and having a forward end and a rearward end, said lower-link rearward end being pivotably attached to the forward end of the horizontal reciprocatable piston, said lower-link forward end being pivotably attached to the shank portion of the dual-hook member whereby said upwardly-extending prongs pivot in alternate upper and lower directions as the piston reciprocates for a finite stroke length in alaternate forward and rearward directions;

(H) an upper-link disposed above the said horizontal axis and having a forward end and a rearward end, said upper-link rearward end being pivotably attached to the forward end of the horizontal reciprocatable piston, said upper-link forward end being pivotably attached to the said elongate knife nearer to the knife upper end than to the knife pivotal connection with the casing whereby the said elongate knife pivots in alternate forward-downward and rearward-upward directions faster than do the prongs pivot as said piston reciprocates for a finite stroke length in alternate forward and rearward directions, the length of the upper-link being sufficiently short so that at the rearward limit of travel for the said reciprocatable piston the entire forward cutting edge of the elongate knife is disposed rearwardly of said upwardly-extending prongs and the major portion of the elongate knife including the upper end thereof is disposed above the horizontal axis; and (I) handle means attached to the frame member including a primary handle disposed nearer to the frame rearward end than to the frame forward end and a secondary handle disposed nearer to the frame forward end than to the frame rearward end.

3. The powered cutting apparatus of claim 1 wherein the forward end of the elongate horizontal casing terminates as a pair of substantially parallel tongues, the said horizontal axis being disposed between said tongues; wherein the frame member is of a hollow tubular configuration surrounding said horizontal axis; wherein the rearward portion of said elongate horizontal reciprocatable piston is disposed within said tubular frame member; wherein a transversely disposed gasket is attached to that portion of the ricprocatable piston extending into the frame member whereby said gasket provides slidable engagement between the frame member and piston, the said gasket having a forward limit of travel and a rearward limit of travel within said frame member; wherein pressurized fluid means together with a control valve therefor is employed for reciprocating the gasket and attached piston in alternate forward and rearward directions including a pair of fluid passageways for introducing pressurized fluid from said control valve into the frame member, a first fluid passageway entering the frame member interior rearwardly of the gasket at its rearward limit of travel and the second fluid passageway entering the frame member interior forwardly of the gasket at its forward limit of travel, said control valve being attached to the frame member and including a manually-actuatable regulator for directing pressurized fluid into one of said fluid passageways, said regulator terminating adjacent to the handle means whereby an operator of the apparatus may readily manipulate the said regulator; and wherein the counterbalance engagement means includes a plurality of selectable longitudinal positions.

4. The powered cutting apparatus of claim 3 wherein the elongate horizontal casing rearwardly of the forward end tongues is of a tubular configuration, the forward portion of said reciprocatable piston being disposed within the said tubular casing, the upper side of said tubular casing being longitudinally slotted with the upper-link being disposed within said casing upper side slotted portion; and wherein at the rearward limit of travel for the piston the length of the elongate uniplanar knife between the knife upper end and its pivotal connection with the elongate casing exceeds twice the distance between the casing forward end and the rearward side of the upwardly-extending prongs.

5. The powered cutting apparatus of claim 4 wherein the dual-hook member is pivotably connected to the forwardly extending tongues of the elongate casing with a first transverse pivot pin passing through the dual-hook member rearwardly of the upwardly-extending prongs, said first transverse pivot pin also passing through the lower portion of the elongate knife to provide the pivotal connection between the elongate knife and casing, said dual-hook member including a shank portion extending rearwardly of the first transverse pivot pin; wherein the lower side of the tubular casing is longitudinally slotted; wherein there is a lower-link disposed below the horizontal axis and within the casing lower side slotted portion and having a forward end and a rearward end, said lower-link rearward end being pivotally attached to the forward end of the horizontal reciprocatable piston, said lower-link forward end being pivotably attached to the shank portion of the dual-hook member whereby said upwardly-extending prongs pivot in alternate upward and downward directions as the piston reciprocates in alternate forward and rearward directions; wherein the upper-link forward end is pivotably attached closer to the knife upper end than to the first transverse pivot pin whereby the said elongate knife pivots in alternate forward-downward and rearward-upward directions at a faster rate than do the prongs move as said piston reciprocates for a finite stroke length in alternate forward and rearward directions; wherein the control valve is disposed rearwardly of the frame member and below the primary handle, the control valve manually-actuatable regulator including a vertically reciprocatable spindle having an upper end that terminates below the primary handle and a lever disposed along the primary handle lower side and pivotably attached thereto, the forward end of the lever being pivotably attached to the valve spindle; and wherein the secondary handle integrally includes a centrally-perforate transverse flange that surrounds the casing and is removably attached to the frame member forward end whereby the secondary handle might be selectively positioned on either lateral side of the frame member.

6. The powered cutting apparatus of claim 2 wherein the elongate horizontal casing is of a tubular configuration, the forward end of said tubular casing terminating as a pair of substantially parallel tongues, the said horizontal axis being disposed between said tongues, the upper and lower sides of said elongate casing being longitudinally slotted to accommodate the upper-link and lower-link respectively along said casing longitudinally slotted portions; wherein the frame member is of a hollow tubular configuration surrounding said horizontal axis; wherein the rearward portion of said elongate horizontal reciprocatable piston is disposed within said tubular frame member and wherein the forward portion of said reciprocatable piston is disposed within the said tubular casing; wherein a transversely disposed gasket is attached to that portion of the reciprocatable piston extending into the frame member whereby said gasket provides slidable engagement between the frame member and piston, the said gasket having a forward limit of travel and a rearward limit of travel within said frame member; and wherein pressurized fluid means together with a control valve therefor is employed for reciprocating the gasket and attached piston in alternate forward and rearward directions including a pair of fluid passageways for introducing pressurized fluid from said control valve into the frame member, a first fluid passageway entering the frame member interior rearwardly of the gasket at its rearward limit of travel and the second fluid passageway entering the frame member interior forwardly of the gasket at its forward limit of travel, said control valve being attached to the frame member and including a manually-actuatable regulator for directing pressurized fluid into one of said fluid passageways, said regulator terminating adjacent to the handle means whereby an operator of the apparatus might readily manipulate the said regulator.

7. The powered cutting apparatus of claim 6 wherein the rearward side of said upwardly-extending prongs is of a concave configuration; wherein the lower portion of the elongate knife is disposed between said upwardly-extending prongs, the dual-hook member shank portion and the elongate knife lower portion being pivotably connected to the forwardly extending tongues of the elongate casing with a first transverse pivot pin; and wherein at the rearward limit of travel for the piston the length of the elongate uniplanar knife between the knife upper end and the first transverse pivot pin exceeds twice the distance between the casing forward end and the concave rearward side of the upwardly-extending prongs.

8. The powered cutting apparatus of claim 7 wherein the piston forward end includes an adapter main body, removably attached to the piston, the forward end of said adapter portion being of a clevis configuration, the rearward ends of the upper-link and lower-link being disposed in side-by-side relationship within the adapter forward clevis and being pivotably attached to the adapter clevis; and wherein at the rearward limit of travel for the piston the length of the elongate uniplanar knife between the knife upper and the first transverse pivot pin bears a ratio less than 5 to the distance between the casing forward end and the concave rearward side of the upwardly-extending prongs.

9. The powered cutting apparatus of claim 8 wherein the transverse spacing of the dual-hook member prongs exceeds the transverse width of the dual-hook member shank portion; and wherein there are counterbalance engagement means attached to the frame member and disposed along the frame upper side, said counterbalance engagement means including a plurality of selectable longitudinal positions.

10. The powered cutting apparatus of claim 9 wherein the control valve is disposed rearwardly of the frame member and below the primary handle, the control valve manually-actuatable regulator including a vertically reciprocatable spindle having an upper end that terminates below the primary handle and a lever disposed along the primary handle lower side and pivotably attached thereto, the forward end of the lever being pivotably attached to the valve spindle; wherein the secondary handle integrally includes a centrally-perforate transverse flange that surrounds the casing and is removably attached to the frame member forward end whereby the secondary handle might be selectively positioned on either lateral side of the frame member; and wherein the dual-hook member comprises two uni-hook members disposed in side-by-side relationship between the casing tongues, each uni-hook member comprising one said upwardly-extending prong and a perforate ear, said first transverse pivot pin extending through the perforate ears of the respective uni-hook members; and wherein the primary handle is of tubular configuration and is substantially parallel to and is disposed above the horizontal axis, and wherein the secondary handle is substantially horizontal and coplanar with the horizontal axis.

References Cited
UNITED STATES PATENTS

| | | | |
|---|---|---|---|
| 1,741,554 | 12/1929 | Buchwald | 17—23 |
| 2,634,457 | 4/1953 | Moyer et al. | 17—23 |
| 2,644,194 | 7/1953 | Fill | 17—23 |
| 2,699,756 | 1/1955 | Miller | 30—228 X |
| 2,733,506 | 2/1956 | Wild | 30—228 |
| 3,056,202 | 10/1962 | Chandler | 30—277 |

LUCIE H. LAUDENSLAGER, Primary Examiner

U.S. Cl. X.R.

30—228, 277; 146—138, 149